United States Patent
Curcio et al.

(10) Patent No.: US 11,094,130 B2
(45) Date of Patent: Aug. 17, 2021

(54) METHOD, AN APPARATUS AND A COMPUTER PROGRAM PRODUCT FOR VIDEO ENCODING AND VIDEO DECODING

(71) Applicant: Nokia Technologies Oy, Espoo (FI)

(72) Inventors: Igor Curcio, Tampere (FI); Sujeet Mate, Tampere (FI); Kashyap Kammachi Sreedhar, Tampere (FI); Emre Aksu, Tampere (FI); Miska Hannuksela, Tampere (FI); Ari Hourunranta, Tampere (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 16/745,770

(22) Filed: Jan. 17, 2020

(65) Prior Publication Data
US 2020/0250891 A1 Aug. 6, 2020

(30) Foreign Application Priority Data
Feb. 6, 2019 (FI) .................................... 20195079

(51) Int. Cl.
*G06T 19/00* (2011.01)
*G06F 3/01* (2006.01)
*H04N 13/161* (2018.01)
*H04N 13/111* (2018.01)

(52) U.S. Cl.
CPC ............ *G06T 19/006* (2013.01); *G06F 3/011* (2013.01); *H04N 13/111* (2018.05); *H04N 13/161* (2018.05)

(58) Field of Classification Search
CPC ..... G06T 19/006; G06T 11/003; G06T 11/00; G06T 2200/16; H04N 13/161; H04N 13/111; H04N 5/23238; G06F 3/011
See application file for complete search history.

(56) References Cited

U.S. PATENT DOCUMENTS

| | | | |
|---|---|---|---|
| 2013/0271565 A1* | 10/2013 | Chen .................... | H04N 13/161 348/43 |
| 2015/0172544 A1* | 6/2015 | Deng ................... | H04N 19/597 348/36 |
| 2016/0012855 A1* | 1/2016 | Krishnan ............. | G11B 27/105 386/241 |

(Continued)

FOREIGN PATENT DOCUMENTS

WO        2018/071562 A1      4/2018

OTHER PUBLICATIONS

"Information Technology—Coding of Audio-visual Objects—Part 12 : ISO Base Media File Format", ISO/IEC 14496-12, Dec. 15, 2015, 248 pages.

(Continued)

*Primary Examiner* — Abderrahim Merouan
(74) *Attorney, Agent, or Firm* — Harrington & Smith

(57) ABSTRACT

The embodiments relate to a method, and a technical equipment for implementing the method. The method comprises generating a bitstream defining a presentation, the presentation comprising an omnidirectional visual media content; and indicating in the bitstream a definition for an external media to be overlaid on the omnidirectional visual media content during rendering; wherein the definition comprises at least an overlay placement information for the external media on the omnidirectional visual media content. The embodiments also relate to a method and technical equipment for decoding the bitstream.

20 Claims, 5 Drawing Sheets

(56) References Cited

U.S. PATENT DOCUMENTS

| | | | | |
|---|---|---|---|---|
| 2016/0379415 | A1* | 12/2016 | Espeset | G06T 7/20 |
| | | | | 345/633 |
| 2017/0105007 | A1* | 4/2017 | Kim | H04N 19/14 |
| 2017/0238055 | A1* | 8/2017 | Chang | G06F 3/013 |
| | | | | 725/19 |
| 2018/0167634 | A1* | 6/2018 | Salmimaa | H04N 19/187 |
| 2018/0240276 | A1 | 8/2018 | He et al. | |
| 2018/0332265 | A1 | 11/2018 | Hwang et al. | |
| 2018/0374192 | A1* | 12/2018 | Kunkel | G06T 15/205 |
| 2019/0114485 | A1* | 4/2019 | Chan | H04N 21/4223 |
| 2020/0074181 | A1* | 3/2020 | Chang | G06K 9/00744 |
| 2020/0193163 | A1* | 6/2020 | Chang | G06K 9/00724 |

OTHER PUBLICATIONS

"Information Technology—Coding of Audio-Visual Objects—Part 14 : MP4 File Format", ISO/IEC 14496-14, Nov. 15, 2003, 18 pages.

"Information technology—Coding of Audio-visual Objects—Part 15 : Advanced Video Coding (AVC) File Format", ISO/IEC14496-15, Apr. 15, 2004, 29 pages.

"High Efficiency Video Coding", Series H: Audiovisual and Multimedia Systems Infrastructure of audiovisual services—Coding of moving video, Recommendation ITU-T H.265, Feb., 2018, 692 pages.

"Information Technology—Coded Representation of Immersive Media—Part 2: Omnidirectional Media Format", ISO/IEC 23090-2, Jan. 2019, 19 pages.

"3rd Generation Partnership Project; Technical Specification Group Services and System Aspects; Transparent end-to-end Packet-switched Streaming Service (PSS); Protocols and codecs (Release 15)", 3GPP TS 26.234 V15.1.0, Sep. 2018, pp. 1-174.

"Information Technology—Dynamic Adaptive Streaming Over HTTP (DASH)—Part 1: Media Presentation Description and Segment Formats", ISO/IEC 23009-1, May 15, 2014, 152 pages.

MOATS, "URN Syntax", Network Working Group, RFC 2141, May 1997, pp. 1-8.

Berners-Lee et al., "Uniform Resource Identifier (URI): Generic Syntax", Network Working Group, RFC 3986, Jan. 2005, pp. 1-61.

Office action received for corresponding Finnish Patent Application No. 20195079, dated Sep. 5, 2019, 10 pages.

Wang et al., "WD 2 of ISOIIEC 23090-2 OMAF 2nd Edition", ISO/IEC JTC1/SC29/WG11 N17827-vl, Systems, Jul. 2018, 214 pages.

* cited by examiner

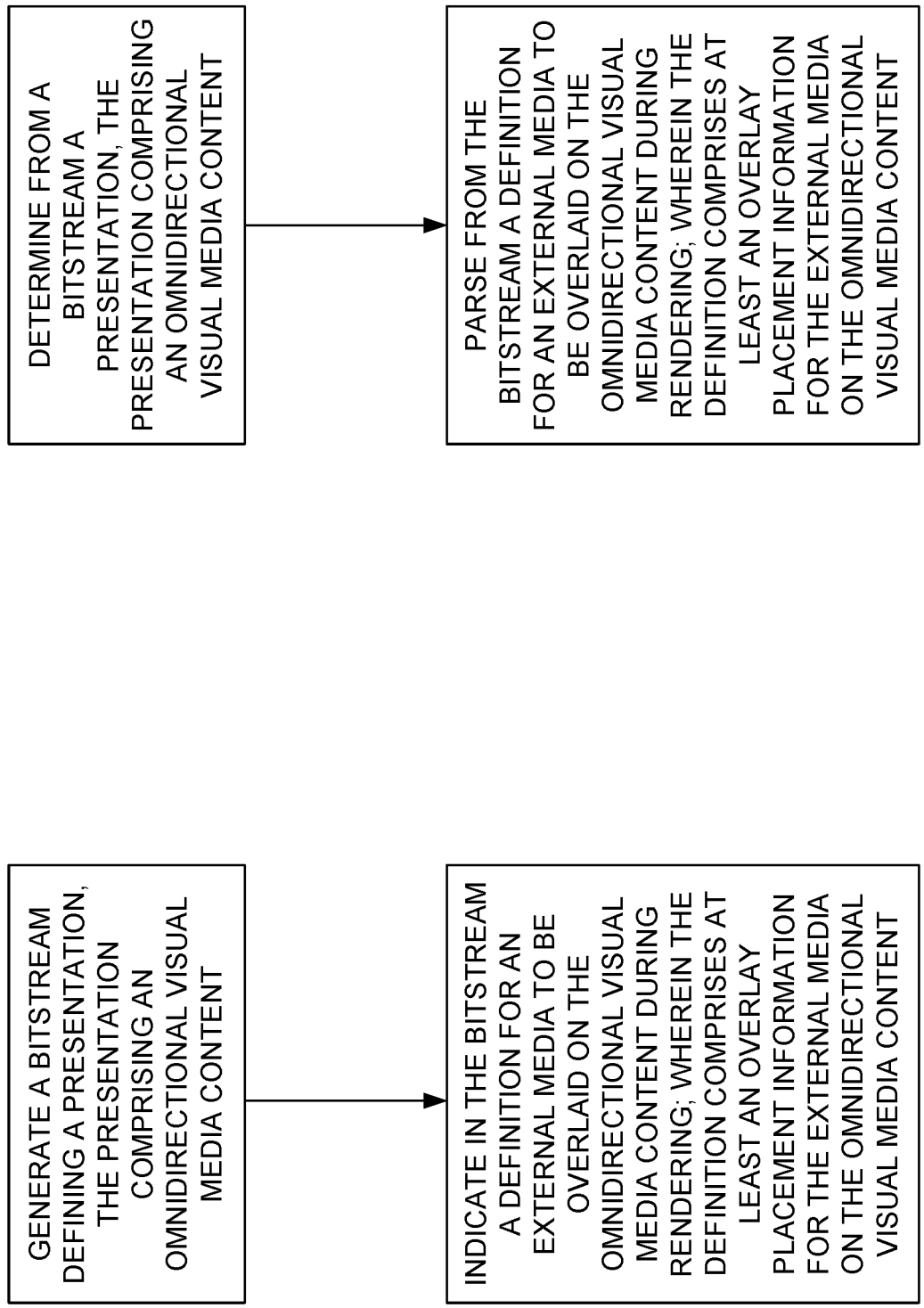

METHOD, AN APPARATUS AND A COMPUTER PROGRAM PRODUCT FOR VIDEO ENCODING AND VIDEO DECODING

TECHNICAL FIELD

The present solution generally relates to video encoding and video decoding.

BACKGROUND

Since the beginning of photography and cinematography, the most common type of image and video content has been captured by cameras with relatively narrow field of view and displayed as a rectangular scene on flat displays. Such content is referred as "flat content", or "flat image", or "flat video" in this application. The cameras are mainly directional, whereby they capture only a limited angular field of view (the field of view towards which they are directed).

More recently, new image and video capture devices are available. These devices are able to capture visual and audio content all around them, i.e. they can capture the whole angular field of view, sometimes referred to as 360 degrees field of view. More precisely, they can capture a spherical field of view (i.e., 360 degrees in all spatial directions). Furthermore, new types of output technologies have been invented and produced, such as head-mounted displays. These devices allow a person to see visual content all around him/her, giving a feeling of being "immersed" into the scene captured by the 360 degrees camera. The new capture and display paradigm, where the field of view is spherical, is commonly referred to as virtual reality (VR) and is believed to be the common way people will experience media content in the future.

SUMMARY

Now there has been invented an improved method and technical equipment implementing the method, for an external interface for immersive media. Various aspects include a method, an apparatus and a computer readable medium comprising a computer program stored therein, which are characterized by what is stated in the independent claims. Various embodiments are disclosed in the dependent claims.

According to a first aspect, there is provided a method comprising generating a bitstream defining a presentation, the presentation comprising an omnidirectional visual media content; indicating in the bitstream a definition for an external media to be overlaid on the omnidirectional visual media content during rendering; wherein the definition comprises at least an overlay placement information for the external media on the omnidirectional visual media content.

According to an embodiment, the method further comprises indicating in the bitstream one or more of the following: a permissible temporal synchronization skew between the immersive media and the external application media; permissible update frequency (e.g., a picture frame rate); parameters defining the purpose of the overlay; permissible interactions with the external application media.

According to a second aspect, there is provided a method comprising determining from a bitstream a presentation, the presentation comprising an omnidirectional visual media content; parsing from the bitstream a definition for an external media to be overlaid on the omnidirectional visual media content during rendering; wherein the definition comprises at least an overlay placement information for the external media on the omnidirectional visual media content.

According to an embodiment, the method further comprises parsing from the bitstream one or more of the following a permissible temporal synchronization skew between the immersive media and the external application media; permissible update frequency (e.g., a picture frame rate); parameters defining the purpose of the overlay; permissible interactions with the external application media.

According to a third aspect, there is provided an apparatus comprising at least means for generating a bitstream defining a presentation, the presentation comprising an omnidirectional visual media content; and means for indicating in the bitstream a definition for an external media to be overlaid on the omnidirectional visual media content during rendering; wherein the definition comprises at least an overlay placement information for the external media on the omnidirectional visual media content.

According to an embodiment, the apparatus further comprises means for indicating in the bitstream one or more of the following: a permissible temporal synchronization skew between the immersive media and the external application media; permissible update frequency (e.g., a picture frame rate); parameters defining the purpose of the overlay; permissible interactions with the external application media.

According to an embodiment, the overlay placement information comprises information on at least one of the following: a size of an overlay; a location of an overlay; an orientation of an overlay; and a layering order of an overlay in relation to other overlays and/or the background media.

According to an embodiment, the overlay placement information comprises one or more of the following:
  placement locking type;
  position and size of the overlay relative to the viewport;
  information indicative of stereoscopic rendering;
  position and size of the overlay relative to the sphere;
  depth or distance of the surface on which the overlay is rendered;
  rotation of the overlay relative to the surface, plane, or window on which the overlay is rendered;
  layering order.

According to an embodiment, the size of the overlay is dynamic to be changed during a presentation, wherein the size of the overlay is stored as a timed metadata track.

According to an embodiment, the apparatus comprises at least one processor, memory including computer program code, the memory and the computer program code.

According to a fourth aspect, there is provided an apparatus comprising at least means for determining from a bitstream a presentation, the presentation comprising an omnidirectional visual media content; and means parsing from the bitstream a definition for an external media to be overlaid on the omnidirectional visual media content during rendering; wherein the definition comprises at least a placeholder for the external media on the omnidirectional visual media content.

According to an embodiment, the apparatus comprises means for parsing from the bitstream one or more of the following: a permissible temporal synchronization skew between the immersive media and the external application media; permissible update frequency (e.g., a picture frame rate); parameters defining the purpose of the overlay; permissible interactions with the external application media.

According to an embodiment, the overlay placement information comprises information on at least one of the following: a size of an overlay; a location of an overlay; an orientation of an overlay; and a layering order of an overlay in relation to other overlays and/or the background media.

According to an embodiment, the overlay placement information comprises one or more of the following:
placement locking type;
position and size of the overlay relative to the viewport;
information indicative of stereoscopic rendering;
position and size of the overlay relative to the sphere;
depth or distance of the surface on which the overlay is rendered;
rotation of the overlay relative to the surface, plane, or window on which the overlay is rendered;
layering order.

According to an embodiment, the apparatus further comprises further comprising means for parsing the size of the overlay from a timed metadata track, wherein the size of the overlay is dynamic and changed during a presentation.

According to an embodiment, the apparatus comprises at least one processor, memory including computer program code, the memory and the computer program code.

According to a fifth aspect, there is provided a computer program product comprising computer program code configured to, when executed on at least one processor, cause an apparatus or a system to generate a bitstream defining a presentation, the presentation comprising an omnidirectional visual media content; and indicate in the bitstream a definition for an external media to be overlaid on the omnidirectional visual media content during rendering; wherein the definition comprises at least an overlay placement information for the external media on the omnidirectional visual media content.

According to an embodiment, the computer program product is embodied on a non-transitory computer readable medium.

According to a sixth aspect, there is provided a computer program product comprising computer program code configured to, when executed on at least one processor, cause an apparatus or a system to determine from a bitstream a presentation, the presentation comprising an omnidirectional visual media content; and to parse from the bitstream a definition for an external media to be overlaid on the omnidirectional visual media content during rendering; wherein the definition comprises at least an overlay placement information for the external media on the omnidirectional visual media content.

According to an embodiment, the computer program product is embodied on a non-transitory computer readable medium.

DESCRIPTION OF THE DRAWINGS

In the following, various embodiments will be described in more detail with reference to the appended drawings, in which
FIG. 4 is a flowchart illustrating a method according to an embodiment;
FIG. 5 is a flowchart illustrating a method according to another embodiment.

DESCRIPTION OF EXAMPLE EMBODIMENTS

Figure 1:
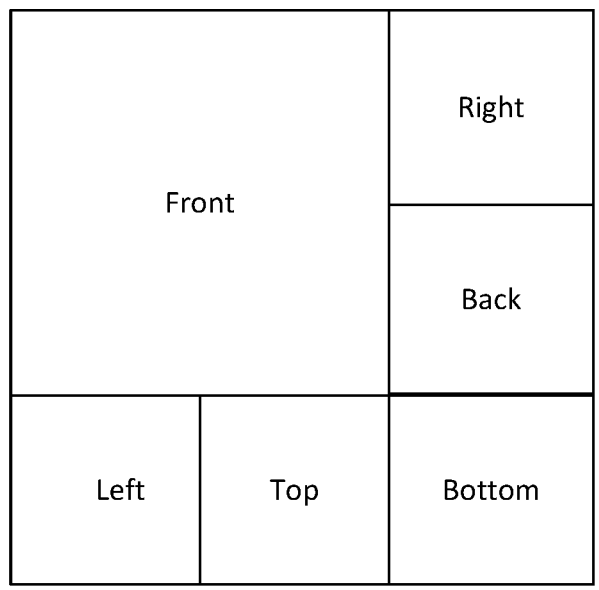
FIG. 1 shows an example of a cube map.

In the following, several embodiments will be described in the context of virtual reality (VR).

VR content consumption is immersive. There are many scenarios which require the VR user to view or interact with content or information which is not germinating from the VR content. There is a need to provide a flexible interface for VR content which allows to inter-work with other information sources.

Available media file format standards include International Standards Organization (ISO) base media file format (ISO/IEC 14496-12, which may be abbreviated ISOBMFF), Moving Picture Experts Group (MPEG)-4 file format (ISO/IEC 14496-14, also known as the MP4 format), file format for NAL (Network Abstraction Layer) unit structured video (ISO/IEC 14496-15) and High Efficiency Video Coding standard (HEVC or H.265/HEVC).

Some concepts, structures, and specifications of ISOBMFF are described below as an example of a container file format, based on which some embodiments may be implemented. The aspects of the disclosure are not limited to ISOBMFF, but rather the description is given for one possible basis on top of which at least some embodiments may be partly or fully realized.

A basic building block in the ISO base media file format is called a box. Each box has a header and a payload. The box header may indicate the type of the box and the size of the box in terms of bytes. Box type may be identified by an unsigned 32-bit integer, interpreted as a four character code (4CC). A box may enclose other boxes, and the ISO file format specifies which box types are allowed within a box of a certain type. Furthermore, the presence of some boxes may be mandatory in each file, while the presence of other boxes may be optional. Additionally, for some box types, it may be allowable to have more than one box present in a file. Thus, the ISO base media file format may be considered to specify a hierarchical structure of boxes.

In files conforming to the ISO base media file format, the media data may be provided in one or more instances of MediaDataBox ('mdat'), and the MovieBox ('moov') may be used to enclose the metadata for timed media. In some cases, for a file to be operable, both of the 'mdat' and 'moov' boxes may be required to be present. The 'moov' box may include one or more tracks, and each track may reside in one corresponding TrackBox ('trak'). Each track may be associated with a handler, identified by a four-character code, specifying the track type. Video, audio, and image sequence tracks can be collectively called as media tracks, and they contain an elementary media stream. Other track types comprise hint tracks and timed metadata tracks.

Tracks comprise samples, such as audio and video frames. For video tracks, a media sample may correspond to a coded picture or an access unit.

A media track refers to samples (which may also be referred to as media samples) formatted according to a media compression format (and its encapsulation to the ISO base media file format). A hint track refers to hint samples, containing instructions for constructing packets for transmission over an indicated communication protocol. A timed metadata track may refer to samples describing referred media and/or hint samples.

The 'trak' box includes in its hierarchy of boxes the SampleDescriptionBox, which gives detailed information about the coding type used, and any initialization information needed for that coding. The SampleDescriptionBox contains an entry-count and as many sample entries as the entry-count indicates. The format of sample entries is track-type specific but derived from generic classes (e.g. Visual-SampleEntry, AudioSampleEntry). Which type of sample entry form is used for derivation of the track-type specific sample entry format is determined by the media handler of the track.

The track reference mechanism can be used to associate tracks with each other. The TrackReferenceBox includes box(es), each of which provides a reference from the containing track to a set of other tracks. These references are labeled through the box type (e.g., the four-character code of the box) of the contained box(es).

The ISO Base Media File Format contains three mechanisms for timed metadata that can be associated with particular samples: sample groups, timed metadata tracks, and sample auxiliary information. A derived specification may provide similar functionality with one or more of these three mechanisms.

A sample grouping in the ISO base media file format and its derivatives, such as the advanced video coding (AVC) file format and the scalable video coding (SVC) file format, may be defined as an assignment of each sample in a track to be a member of one sample group, based on a grouping criterion. A sample group in a sample grouping is not limited to being contiguous samples and may contain non-adjacent samples. As there may be more than one sample grouping for the samples in a track, each sample grouping may have a type field to indicate the type of grouping. Sample groupings may be represented by two linked data structures: (1) a SampleToGroupBox ('sbgp' box) represents the assignment of samples to sample groups; and (2) a SampleGroupDescriptionBox ('sgpd' box) contains a sample group entry for each sample group describing the properties of the group. There may be multiple instances of the SampleToGroupBox and SampleGroupDescriptionBox based on different grouping criteria. These may be distinguished by a type field used to indicate the type of grouping. SampleToGroupBox may comprise a grouping_type_parameter field that can be used e.g. to indicate a sub-type of the grouping.

In ISOMBFF, an edit list provides a mapping between the presentation timeline and the media timeline. Among other things, an edit list provides for the linear offset of the presentation of samples in a track, provides for the indication of empty times and provides for a particular sample to be dwelled on for a certain period of time. The presentation timeline may be accordingly modified to provide for looping, such as for the looping videos of the various regions of the scene. One example of the box that includes the edit list, the EditListBox, is provided below:

```
aligned(8) class EditListBox extends FullBox('elst', version, flags) {
    unsigned int(32) entry_count;
    for (i=1; i <= entry_count; i++) {
    if (version==1) {
        unsigned int(64)    ) segment_duration;
        int(64) media_time;
    } else { // version==0
        unsigned int(32) segment_duration;
        int(32) media_time;
    }
    int(16) media_rate_integer;
    int(16) media_rate_fraction = 0;
    }
}
```

In ISOBMFF, an EditListBox may be contained in EditBox, which is contained in TrackBox ('trak'). In such example of the edit list box, flags specifies the repetition of the edit list. By way of example, setting a specific bit within the box flags (the least significant bit, i.e., flags & 1 in ANSI-C notation, where "&" indicates a bit-wise AND operation) equal to 0 specifies that the edit list is not repeated, while setting the specific bit (i.e., flags & 1 in ANSI-C notation) equal to 1 specifies that the edit list is repeated. The values of box flags greater than 1 may be defined to be reserved for future extensions. As such, when the edit list box indicates the playback of zero or one samples, (flags & 1) shall be equal to zero. When the edit list is repeated, the media at time 0 resulting from the edit list follows immediately the media having the largest time resulting from the edit list follows immediately the media having the largest time resulting from the edit list such that the edit list is repeated seamlessly.

In ISOBMFF, a Track group enables grouping of tracks based on certain characteristics or the tracks within a group have a particular relationship. Track grouping, however, does not allow any image items in the groups.

The syntax of TrackGroupBox in ISOBMFF is as follows:

```
aligned(8) class TrackGroupBox extends Box('trgr') {
}
aligned(8) class TrackGroupTypeBox(unsigned int(32) track_group_type)
extends FullBox(track_group_type, version = 0, flags = 0)
{
    unsigned int(32) track_group_id;
    // the remaining data may be specified for a particular
        track_group_type
}
``` track_group_type indicates the grouping_type and shall be set to one of the following values, or a value registered, or a value from a derived specification or registration:

'msrc' indicates that this track belongs to a multi-source presentation. The tracks that have the same value of track_group_id within a TrackGroupTypeBox or track_group_type 'msrc' are mapped as being originated from the same source. For example, a recording of a video telephone call may have both audio and video for both participants, and the value of track_group_id associated with the audio track and the video track of one participant differs from value of track_group_id associated with the tracks of the other participant.

The pair of track_group_id and track_group_type identifies a track group within the file. The tracks that contain a particular TrackGroupTypeBox having the same value of track_group_id and track_group_type belong to the same track group.

The Entity grouping is similar to track grouping but enables grouping of both tracks and image items in the same group. The syntax of EntityToGroupBox is ISOBMFF is as follows:

```
aligned(8) class EntityToGroupBox(grouping_type, version, flags)
extends FullBox(grouping_type, version, flags) {
    unsigned int(32) group_id;
    unsigned int(32) num_entities_in_group;
    for(i=0; i<num_entities_in_group; i++)
        unsigned int(32) entity_id;
}
``` group_id is a non-negative integer assigned to the particular grouping that shall not be equal to any group_id value of any other EntityToGroupBox, any item_ID value of the hierarchy level (file, movie, or track) that contains the GroupsListBox, or any track_ID value (when the GroupsListBox is contained in the file level).

num_entities_in_group specifies the number of entity_id values mapped to this entity group.

entity_id is resolved to an item, when an item with item_ID equal to entity_id is present in the hierarchy level (file, movie or track) that contains the GroupsListBox, or to a track, when a track with track_ID equal to entity_id is present and the GroupsListBox is contained in the file level.

Files conforming to the ISOBMFF may contain any non-timed objects, referred to as items, meta items or metadata items, in a meta box (four-character code: 'meta').

While the name of the meta box refers to metadata, items can generally contain metadata or media data. The meta box may reside at the top level of the file, within a movie box (four-character code: 'moov'), and within a track box (four-character code: 'trak'), but at most one meta box may occur at each of the file level, movie level, or track level. The meta box may be required to contain a 'hdlr' box indicating the structure or format of the 'meta' box contents. The meta box may list and characterize any number of items that can be referred and each of them can be associated with a file name and are uniquely identified with the file by item identifier (item_id) which is an integer value. The metadata items may be for example stored in the 'idat' box of the meta box or in an 'mdat' box or reside in a separate file. If the metadata is located external to the file then its location may be declared by the DataInformationBox (four-character code: 'dinf'). In the specific case that the metadata is formatted using eXtensible Markup Language (XML) syntax and is required to be stored directly in the MetaBox, the metadata may be encapsulated into either the XMLBox (four-character code: 'xml') or the BinaryXMLBox (four-character code: 'bxml'). An item may be stored as a contiguous byte range, or it may be stored in several extents, each being a contiguous byte range. In other words, items may be stored fragmented into extents, e.g. to enable interleaving. An extent is a contiguous subset of the bytes of the resource. The resource can be formed by concatenating the extents.

The ItemPropertiesBox enables the association of any item with an ordered set of item properties. Item properties may be regarded as small data records. The ItemPropertiesBox consists of two parts: ItemPropertyContainerBox that contains an implicitly indexed list of item properties, and one or more ItemPropertyAssociationBox(es) that associated items with item properties.

High Efficiency Image File Format (HEIF) is a standard developed by the Moving Pictures Experts Group (MPEG) for storage of images and image sequences. Among other things, the standard facilitates file encapsulation of data coded according to the High Efficiency Video Coding (HEVC) standard. HEIF includes features building on top of the used ISO Base Media File Format (ISOBMFF).

The ISOBMFF structures and features are used to a large extent in the design of HEIF. The basic design for HEIF comprises still images that are stored as items and image sequences that are stored as tracks.

In the context of HEIF, the following boxes may be contained within the root-level 'meta' box and may be used as described in the following. In HEIF, the handler value of the Handler box of the 'meta' box is 'pict'. The resource (whether within the same file, or in an external file identified by a uniform resource identifier) containing the coded media data is resolved through the Data Information ('dinf') box, whereas the Item Location ('iloc') box stores the position and sizes of every item using typed referencing. If there is an item among a collection of items that is in some way to be considered the most important compared to others, then this item is signaled by the Primary Item ('pitm') box. Apart from the boxes mentioned here, the 'meta' box is also flexible to include other boxes that may be necessary to describe items.

Any number of image items can be included in the same file. Given a collection of images stored by using the 'meta' box approach, it sometimes is essential to qualify certain relationships between images. Examples of such relationships include indicating a cover image for a collection, providing thumbnail images for some or all of the images in the collection, and associating some or all of the images in a collection with an auxiliary image such as an alpha plane. A cover image among the collection of images is indicated using the 'pitm' box. A thumbnail image or an auxiliary image is linked to the primary image item using an item reference of type 'thmb' or 'auxl' respectively.

In the following, term "omnidirectional" may refer to media content that has greater spatial extent than a field-of-view of a device rendering the content. Omnidirectional content may for example cover substantially 360 degrees in the horizontal dimension and substantially 180 degrees in the vertical dimension, but omnidirectional may also refer to content covering less than 360 degree view in the horizontal direction and/or 180 degree view in the vertical direction.

A panoramic image covering a 360-degree field-of-view horizontally and a 180-degree field-of-view vertically can be represented by a sphere that has been mapped to a two-dimensional image plane using equirectangular projection (ERP). In this case, the horizontal coordinate may be considered equivalent to a longitude, and the vertical coordinate may be considered equivalent to a latitude, with no transformation or scaling applied. In some cases, panoramic content with a 360-degree horizontal field-of-view, but with less than a 180-degree vertical field-of-view may be considered special cases of equirectangular projection, where the polar areas of the sphere have not been mapped onto the two-dimensional image plane. In some cases, panoramic content may have less than a 360-degree horizontal field-of-view and up to a 180-degree vertical field-of-view, while otherwise having the characteristics of an equirectangular projection format.

Immersive multimedia, such as omnidirectional content consumption is more complex for the end user compared to the consumption of 2D content. This is due to the higher degree of freedom available to the end user. The freedom also results in more uncertainty. The MPEG Omnidirectional Media Format (OMAF) v1 standardized the omnidirectional streaming of single 3DoF content (where the viewer is located at the centre of a unit sphere and has three degrees of freedom (Yaw-Pitch-Roll). The next phase standardization (MPEG-I Phase 1b) is under progress. This phase is expected to enable multiple 3 DoF and 3 DoF+ content consumption as well as overlay support with user interaction and means to optimize the Viewport Dependent Streaming operations and bandwidth management.

The 360-degree space may be divided into a discrete set of viewports, each separated by a given distance (e.g., expressed in degrees), so that the omnidirectional space can be imagined as a map of overlapping viewports, and the primary viewport is switched discretely as the user changes his/her orientation while watching content with a head-mounted display (HMD). When the overlapping between viewports is reduced to zero, the viewports can be imagined as adjacent non-overlapping tiles within the 360-degrees space. The H.265 video codec implements the concept of tiles which may be used to realize this scenario (both overlapping and not).

As used herein, the term "random access" may refer to the ability of a decoder to start decoding a stream at a point other than the beginning of the stream and recover an exact or approximate reconstructed media signal, such as a representation of the decoded pictures. A random access point and a recovery point may be used to characterize a random access operations. A random access point may be defined as a location in a media stream, such as an access unit or a coded picture within a video bitstream, where decoding can be initiated. A recovery point may be defined as a first location in a media stream or within the reconstructed signal characterized in that all media, such as decoded pictures, at or subsequent to a recover point in output order are correct or approximately correct in content, when the decoding has started from the respective random access point. If the random access point is the same as the recovery point, the random access operation is instantaneous; otherwise, it may be gradual.

Random access points enable, for example, see, fast forward play, and fast backward play operations in locally stored media streams as well as in media streaming. In contexts involving on-demand streaming, servers can respond to seek requests by transmitting data starting from the random access point that is closest to (and in many cases preceding) the requested destination of the seek operation and/or decoders can start decoding from the random access point that is closest to (and in many cases preceding) the requested destination of the seek operation. Switching between coded streams of different bit-rates is a method that is used commonly in unicast streaming to match the transmitted bitrate to the expected network throughput and to avoid congestion in the network. Switching to another stream is possible at a random access point. Furthermore, random access points enable tuning in to a broadcast or multicast. In addition, a random access point can be coded as a response to a scene cut in the source sequence or as a response to an intra picture update request.

When streaming VR video, a subset of 360-degree video content covering the primary viewport (i.e., the current view orientation) may be transmitted at the best quality/resolution, while the remaining of 360-degree video may be transmitted at a lower quality/resolution. There are generally two approaches for viewport-adaptive streaming:

1. Viewport-specific encoding and streaming, a.k.a. viewport-dependent encoding and streaming, a.k.a. asymmetric projection, a.k.a. packed VR video. In this approach, 360-degree image content is packed into the same frame with an emphasis (e.g. greater spatial area) on the primary viewport. The packed VR frames are encoded into a single bitstream. For example, the front face of a cube map may be sampled with a higher resolution compared to other cube faces and the cube faces may be mapped to the same packed VR frame as shown in FIG. 1.
2. VR viewport video, a.k.a. tile-based encoding and streaming. In this approach, 360-degree content is encoded and made available in a manner that enables selective streaming of viewports from different encoding. For example, each cube face may be separately encoded and encapsulated in its own track (and Representation). More than one encoded bitstream for each cube face may be provided, e.g. each with different spatial resolution. Players can choose tracks (or Representations) to be decoded and played based on the current viewing orientation. High-resolution tracks (or Representations) may be selected for the cube faces used for rendering for the present viewing orientation, while the remaining cube faces may be obtained from their low-resolution tracks (or Representations). According to another example, equirectangular panorama content is encoded using motion-constrained tile sets. More than one encoded bitstream may be provided, e.g. with different spatial resolution and/or picture quality. Each motion-constrained tile set is made available in its own track (and Representation). Players can choose tracks (or Representations) to be decoded and played based on the current viewing orientation. High-resolution or high-quality tracks (or Representations) may be selected for tile sets covering the present primary viewport, while the remaining area of the 360-degree content may be obtained from low-resolution or low-quality tracks (or Representations).

The previous approaches may also be combined.

In cube map projection format, spherical video is projected onto the six faces (a.k.a. sides) of a cube. The cube map may be generated e.g. by first rendering the spherical scene six times from a viewpoint, with the views defined by a 90 degree view frustum representing each cube face. The cube sides may be frame-packed into the same frame or each cube side may be treated individually (e.g. in encoding). There are many possible orders of locating cube sides onto a frame and/or cube sides may be rotated or mirrored. The frame width and height for frame-packing may be selected to fit the cube sides "tightly", e.g. at 3×2 cube side grid, or may include unused constituent frames, e.g. at 4×3 cube side grid.

In general, 360-degree content can be mapped onto different types of solid geometrical structures, such as a polyhedron (i.e., a three-dimensional solid object containing flat polygonal faces, straight edges and sharp corners or vertices, e.g., a cube or a pyramid), a cylinder (by projecting a spherical image onto the cylinder, as described above with the equirectangular projection), a cylinder (directly without projecting onto a sphere first), a cone, etc. and then unwrapped to a two-dimensional image plane. The two-dimensional image plane can also be regarded as a geometrical structure. In other words, 360-degree content can be mapped onto a first geometrical structure and further unfolded to a second geometrical structure. However, it may be possible to directly obtain the transformation to the second geometrical structure from the original 360-degree content or from other wide view visual content. In general, an omnidirectional projection format may be defined as a format to represent (up to) 360-degree content on a two-dimensional image plane. Examples of omnidirectional projection formats include the equirectangular projection format and the cubemap projection format.

A viewport may be defined as a region of omnidirectional image or video suitable for display and viewing by the user. A current viewport (which may be sometimes referred simply as a viewport) may be defined as the part of the spherical video that is currently displayed and hence is viewable by the user(s). At any point of time, a video rendered by an application on a head-mounted display (HMD) renders a portion of the 360-degrees video, which is referred to as a viewport. Likewise, when viewing a spatial part of the 360-degree content on a conventional display, the spatial part that is currently displayed is a viewport. A viewport is a window on the 360-degree world represented in the omnidirectional video displayed via a rendering display. A viewport may be characterized by a horizontal field-of-view (VHFoV) and a vertical field-of-view (VVFoV). In the following, the horizontal field-of-view of the viewport will be abbreviated with HFoV, and, respectively, the vertical field-of-view of the viewport will be abbreviated with VFoV.

A sphere region may be defined as a region on a sphere that may be specified by four great circles or by two azimuth circles and two elevation circles and additionally by a tile angle indicating rotations along the axis originating from the sphere origin passing through the center point of the sphere region. A great circle may be defined as an intersection of the sphere and a plane that passes through the center point of the sphere. A great circles is also known as an orthodrome or Riemannian circle. An azimuth circle may be defined as a circle on the sphere connecting all points with the same azimuth value. An elevation circle may be defined as a circle on the sphere connecting all points with the same elevation value. A sphere region may be specified e.g. using a syntax structure called SphereRegionStruct.

The Omnidirectional Media Format (OMAF) standard (ISO/IEC 23090-2) specifies a generic timed metadata syntax for sphere regions. A purpose for the timed metadata track is indicated by the track sample entry type. The sample format of all metadata tracks for sphere regions specified starts with a common part and may be followed by an extension part that is specific to the sample entry of the metadata track. Each sample specifies a sphere region.

One of the specific sphere region timed metadata tracks specified in OMAF is known as a recommended viewport timed metadata track, which indicates the viewport that should be displayed when the user does not have control of the viewing orientation or has released control of the viewing orientation. The recommended viewport timed metadata track may be used for indicating a recommended viewport based on a "director's cut" or based on measurements of viewing statistics. A textual description of the recommended viewport may be provided in the sample entry. The type of the recommended viewport may be indicated in the sample entry and may be among the following: A recommended viewport per the director's cut, e.g., a viewport suggested according to the creative intent of the content author or content provider.

Term "overlay" refers to rendering of visual media over 360-degree video content.

Videos and/or images may be overlaid on an omnidirectional video and/or image. The coded overlaying video can be a separate stream or part of the bitstream of the currently rendered background 360-degree video/image.

An overlay may be indicated to be viewport-relative, i.e. have an indicated position and size relative to the viewport. Alternatively, an overlay may be indicated to be sphere-relative, i.e. have an indicated position and, in some cases, an indicated shape and/or size relative a sphere on which the background video/image is rendered.

Indications related to viewport-relative overlays may comprise indicating a disparity used for rendering a monoscopic overlay on a stereoscopic display. The disparity is proportional to the horizontal difference, e.g. in pixels, of the position of the decoded overlay on the left-view viewport relative the position of the decoded overlay on the right-view viewport.

The position and size of a viewport-relative overlay may be indicated for example by using the following structure:

```
aligned(8) class ViewportRelativeOverlay( ) {
    unsigned int(16) rect_left_percent;
    unsigned int(16) rect_top_percent;
    unsigned int(16) rect_width_percent;
    unsigned int(16) rect_height_percent;
    unsigned int(1) relative_disparity_flag;
    bit(7) reserved = 0;
    if (relative_disparity_flag)
        signed int(16) disparity_in_percent;
    else
        signed int(16) disparity_in_pixels;
}
```

The semantics of the syntax element may be specified as follows:

left_percent, top_percent, width_percent and height_percent specify the coordinates of the top-left corner and the width and height of the rectangular region, respectively, of the overlay to be rendered on the viewport in per cents relative to the width and height of the viewport. The values are indicated in units of $2^{-16}$ in the range of 0 (indicating 0%), inclusive, up to but excluding 65536 (that indicates 100%). The size of overlay region over the viewport changes according to the viewport resolution and aspect ratio. However, the aspect ratio of the overlaid media might not be intended to be changed.

relative_disparity_flag indicates whether the disparity is provided as a percentage value of the width of the display window for one view (when the value is equal to 1) or as a number of pixels (when the value is equal to 0). This applies for the case when there is a monoscopic overlay.

disparity_in_percent indicates the disparity, in units of $2^{-16}$, as a fraction of the width of the display window for one view. The value may be negative, in which case the displacement direction is reversed. This value is used to displace the region to the left on the left eye view and to the right on the right eye view. This applies for the case when there is a monoscopic overlay and stereoscopic background visual media.

disparity_in_pixels indicates the disparity in pixels. The value may be negative, in which case the displacement direction is reversed. This value is used to displace the region to the left on the left eye view and to the right on the right eye view. This applies for the case when there is a monoscopic overlay and stereoscopic background visual media.

The position and size of a sphere-relative overlay may be indicated through different means, such as 2D coordinates relative to the projected picture or as a sphere region. Indications for a sphere-relative overlay may comprise a depth or a distance of a surface for the overlay. The depth may be relative to the unit sphere on which the background visual media is rendered.

The position and size of a sphere-relative omnidirectional overlay may be indicated for example by using the following structure:

```
aligned(8) class SphereRelativeOmniOverlay( ) {
    unsigned int(1) region_indication_type;
    bit(7) reserved = 0;
    if (region_indication_type == 0) {
        unsigned int(32) proj_picture_width;
        unsigned int(32) proj_picture_height;
        unsigned int(32) proj_reg_width;
        unsigned int(32) proj_reg_height;
        unsigned int(32) proj_reg_top;
        unsigned int(32) proj_reg_left;
    }
    else
```

```
    SphereRegionStruct(1);
    unsigned int(16) region_depth_minus1;
    unsigned int(32) unit_sphere_distance_in_mm; // optional
}
```

The semantics of the syntax elements may be specified for example as follows. region_indication_type equal to 0 specifies that the sphere region on which the overlay is rendered is indicated as a rectangle in a projected picture. region_indication_type equal to 1 specifies that the sphere region on which the overlay is rendered is indicated by the SphereRegionStruct included in this syntax structure. region_indication_type shall be equal to 0 when the projection format of the overlay and the background visual media is identical.

When the SphereRegionStruct is present (i.e., region_indication_type is equal to 1), the sphere region represented by SphereRegionStruct may be required to be specified by four great circles when the associated projection format is cubemap projection and shall be specified by two azimuth circles and two elevation circles when the associated projection format is equirectangular projection.

When region_indication_type is equal to 0, the syntax structure indicates that the projected pictures of overlays are packed region-wise and require unpacking prior to rendering, according to the region-wise packing process information as indicated. The semantics of the syntax elements are identical to those for the syntax elements of RegionWisePackingStruct( ) The syntax elements specify the top-left corner, width, and height of the region relative to a projected picture of given width and height.

region_depth_minus1 indicates the depth (z-value) of the region on which the overlay is to be rendered. The depth value is the norm of the normal vector of the overlay region. region_depth_minus1+1 specifies the depth value relative to a unit sphere in units of $2^{-16}$.

unit_sphere_distance_in_mm specifies a distance, in millimeters, corresponding to the radius of the unit sphere. The value may be used for stereoscopic rendering of the content on the unit sphere together with overlaying content and for deriving suitable binocular disparity for overlaying visual tracks or image items for which the depth is indicated relative to the unit sphere. unit_sphere_distance_in_mm is applicable for stereoscopic rendering when the background visual media or the overlay is monoscopic or when both the background visual media and the overlay are monoscopic.

The position and size of a sphere-relative 2D overlay may be indicated for example by using the following structure:

```
aligned(8) class SphereRelative2DOverlay( ) {
    SphereRegionStruct(1);
    signed int(32) overlay_rot_yaw;
    signed int(32) overlay_rot_pitch;
    signed int(32) overlay_rot_roll;
    unsigned int(16) region_depth_minus1;
    unsigned int(32) unit_sphere_distance_in_mm; // optional
}
```

The semantics of the syntax elements may be specified for example as follows.

SphereRegionStruct( ) indicates a sphere location of the centre of the overlay region that is used, together with the other information, to determine where the overlay is placed and displayed in 3D space. centre_tilt may be required to be equal to 0. The sphere region represented by SphereRegionStruct( ) may be required to be specified by four great circles.

overlay_rot_yaw, overlay_rot_pitch, and overlay_rot_roll specify the rotation of the plane relative to the coordinate system in which the X-axis is the vector from the centre of the overlay region to the origin of the global coordinate axes.

region_depth_minus1 and unit_sphere_distance_in_mm are specified like above.

Indications related to an overlay may comprise a layering order that specifies the z-order among the viewport-relative overlays or the rendering order among sphere-relative overlays having the same depth or distance. For example, it may be specified that viewport-relative overlays are overlaid on top of the viewport in descending order of layering order values, i.e., an overlay with a smaller layering order value is in front of an overlay with a greater layering order value. For sphere-relative overlays, it may be specified that the smaller the value of layering order, the closer the overlay is from the viewer. When not present, layering order may be inferred to be equal to 0.

Overlay placement information may be defined to comprise information that affects the size, location, orientation, and layering order of an overlay in relation to other overlays and the background visual media. Overlay placement information may be defined to comprise but might not be limited to one of more of the following:
  Placement locking type, such as whether the overlay is viewport-relative or sphere-relative.
  Position and size of the overlay relative to the viewport.
  Information indicative of stereoscopic rendering, such as disparity.
  Position and size of the overlay relative to the sphere.
  Depth or distance of the surface on which the overlay is rendered. The depth may be relative to the unit sphere on which the background visual media is rendered.
  Rotation of the overlay relative to the surface, plane, or window on which the overlay is rendered.
  Layering order.

An omnidirectional streaming system may overlay a video/image on top of the omnidirectional video/image being rendered. The overlaid two-dimensional video/image may have a rectangular grid or a non-rectangular grid. The overlaying process may cover the overlaid video/image or a part of the video/image, or there may be some level of transparency/opacity or more than one level of transparency/opacity where in the overlaid video/image may be seen under the overlaying video/image but with less brightness. In other words, there can be an associated level of transparency corresponding to the video/image in a foreground overlay and the video/image in the background (video/image of VR scene). The terms opacity and transparency may be used interchangeably.

The overlaid region may have one or more than one levels of transparency. For example, the overlaid region may have different parts with different levels of transparency. In accordance with an embodiment, the transparency level can be defined to be within a certain range, such as from 0 to 1 so that the smaller the value, the smaller is the transparency, or vice versa.

Additionally, the content provider may choose to overlay a part of the same omnidirectional video over the current viewport of the user. The content provider may want to overlay the video based on the viewing condition of the user. For example, overlaying may be performed, if the user's viewport does not match the content provider's recommended viewport. In this case, the client player logic overlays the content provider's recommended viewport (as a preview window) on top of the current viewport of the user. It may also be possible to overlay the recommended viewport, if the user's current viewport does not match, such that the position of the overlaid video is based on the direction in which the user is viewing. For example, overlaying the recommended viewport to the left of the display, if the recommended viewport is to the left of the user's current viewport. It may also be possible to overlay the whole 360-degree video. Yet another example is to use the overlaying visual information as a guidance mechanism to guide the user towards the recommended viewport, for example guiding people who are hearing impaired.

There may be one or more conditions on when and how to display the visual overlay. Therefore, a rendering device may need to receive information which the rendering device may use to perform the overlaying as indicated by the signaled information.

One or more overlays may be carried in a single visual media track or a single image item. When more than one overlay is carried in a single track or image item, or when an overlay is carried with other media (e.g. background), a mapping of regions from the samples of the track or the image item to the overlay metadata may be provided, e.g. in or associated with the OverlayStruct.

When several track or image items are collectively carrying one or more overlays and/or the background visual media, a group of the tracks and image items may be indicated in a container file. For example, an entity group of ISOBMFF may be used for this purpose.

An overlay may fall outside the user's field of view (FOV), i.e., an viewport of a user becomes non-overlapping with the overlay. For example, after a user rotates during omnidirectional media content playback, the viewport of the user becomes non-overlapping with the visual overlay. Depending on the specific situation, it may be desirable to continue or pause the playback of the overlay when the user is not watching the overlay. For example, it may be desirable to pause a timeline of overlay playback until the overlay overlaps again with the user's viewport. It may also be desirable to continue playback of the overlay even though the overlay is outside the user's viewport.

In OMAF, the location of overlay in 2D picture is defined as below:

```
aligned(8) class OverlaySourceRegion( ) {
    unsigned int(16) packed_picture_width;
    unsigned int(16) packed_picture_height;
    unsigned int(16) packed_reg_width;
    unsigned int(16) packed_reg_height;
    unsigned int(16) packed_reg_top;
    unsigned int(16) packed_reg_left;
    unsigned int(3) transform_type;
    bit(5) reserved = 0;
}
```

The syntax structure indicates the source region of the overlay within the decoded picture.

If the track or image item containing the overlay is a projected omnidirectional video track or image item, the semantics of the syntax elements are identical to those for the syntax elements of RegionWisePackingStruct( ) Otherwise, the semantics of the syntax elements are specified as follows:

packed_picture_width and packed_picture_height specify the width and height of the decoded picture, respectively, in luma samples.

packed_reg_width, packed_reg_height, packed_reg_top, and packed_reg_left specify the width, height, top offset, left offset of the overlay source, respectively, in luma samples within the decoded picture.

transform_type specifies the rotation and mirroring that are applied to the original overlay visual media source. The following values are specified:
  0: no transform
  1: mirroring horizontally
  2: rotation by 180 degrees (counter-clockwise)
  3: rotation by 180 degrees (counter-clockwise) before mirroring horizontally
  4: rotation by 90 degrees (counter-clockwise) before mirroring horizontally
  5: rotation by 90 degrees (counter-clockwise)
  6: rotation by 270 degrees (counter-clockwise) before mirroring horizontally
  7: rotation by 270 degrees (counter-clockwise)

It is appreciated that when the track or image item containing the overlay is not a projected omnidirectional video track or image item, the OMAF player could treat each decoded picture as a texture atlas including sub-images indicated by the overlay source region information. The OMAF player does not need to perform an unpacking process, similar to what is specified for RegionWisePackingStruct, for processing of such a texture atlas.

The Matroska file format is capable of (but not limited to) storing any of video, audio, picture, or subtitle tracks in one file. Matroska file extensions include .mkv for video (with subtitles and audio), .mk3d for stereoscopic video, .mka for audio-only files, and .mks for subtitles only. Matroska may be used as a basis format for derived file formats, such as WebM.

Matroska uses Extensible Binary Meta Language (EBML) as a basis. EBML specifies a binary and octet (byte) aligned format inspired by the principle of XML. EBML itself is a generalized description of the technique of binary markup. A Matroska file consists of Elements that make up an EBML "document." Elements incorporate an Element ID, a descriptor for the size of the element, and the binary data itself. Elements can be nested.

A Segment Element of Matroska is a container for other top-level (level 1) elements. A Matroska file may comprise (but is not limited to be composed of) one Segment. Multimedia data in Matroska files is organized in Clusters (or Cluster Elements), each containing typically a few seconds of multimedia data. A Cluster comprises BlockGroup elements, which in turn comprise Block Elements. A Cues Element comprises metadata which may assist in random access or seeking and may include file pointers or respective timestamps for seek points.

A uniform resource identifier (URI) may be defined as a string of characters used to identify a name of a resource. Such identification enables interaction with representations of the resource over a network, using specific protocols. A URI is defined through a scheme specifying a concrete syntax and associated protocol for the URI. The uniform resource locator (URL) and the uniform resource name (URN) are forms of URI. A URL may be defined as a URI that identifies a web resource and specifies the means of acting upon or obtaining the representation of the resource, specifying both its primary access mechanism and network location. A URN may be defined as a URI that identifies a resource by name in a particular namespace. A URN may be used for identifying a resource without implying its location or how to access it.

Hypertext Transfer Protocol (HTTP) has been widely used for the delivery of real-time multimedia content over the Internet, such as in video streaming applications. Several commercial solutions for adaptive streaming over HTTP, such as Microsoft® Smooth Streaming, Apple® Adaptive HTTP Live Streaming and Adobe® Dynamic Streaming, have been launched as well as standardization projects have been carried out. Adaptive HTTP streaming (AHS) was first standardized in Release 9 of 3rd Generation Partnership Project (3GPP) packet-switched streaming (PSS) service (3GPP TS 26.234 Release 9: "Transparent end-to-end packet-switched streaming service (PSS); protocols and codecs"). MPEG took 3GPP AHS Release 9 as a starting point for the MPEG DASH standard (ISO/IEC 23009-1: "Dynamic adaptive streaming over HTTP (DASH)-Part 1: Media presentation description and segment formats"). MPEG DASH and 3GP-DASH are technically close to each other and may therefore be collectively referred to as DASH. Some concepts, formats, and operations of DASH are described below as an example of a video streaming system, wherein the embodiments may be implemented. The aspects of the invention are not limited to DASH, but rather the description is given for one possible basis on top of which the invention may be partly or fully realized.

In DASH, the multimedia content may be stored on an HTTP server and may be delivered using HTTP. The content may be stored on the server in two parts: Media Presentation Description (MPD), which describes a manifest of the available content, its various alternatives, their URL addresses, and other characteristics; and segments, which contain the actual multimedia bitstreams in the form of chunks, in a single or multiple files. The MPD provides the necessary information for clients to establish a dynamic adaptive streaming over HTTP. The MPD contains information describing media presentation, such as an HTTP-uniform resource locator (URL) of each Segment to make a GET Segment request.

To play the content, the DASH client may obtain the MPD by using HTTP, email, thumb drive, broadcast, or other transport methods, for example. By parsing the MPD, the DASH client may become aware of the program timing, media-content availability, media types, resolutions, minimum and maximum bandwidths, and the existence of various encoded alternatives of multimedia components, accessibility features and required digital rights management (DRM), media-component locations on the network, and other content characteristics. Using this information, the DASH client may select the appropriate encoded alternative and start streaming the content by fetching the segments using HTTP GET requests, for example. After appropriate buffering to allow for network throughput variations, the client may continue fetching the subsequent segments and also monitor the network bandwidth fluctuations. The client may decide how to adapt to the available bandwidth by fetching segments of different alternatives (with lower or higher bitrates) to maintain an adequate buffer.

In the context of DASH, the following definitions may be used: A media content component or a media component may be defined as one continuous component of the media content with an assigned media component type that can be encoded individually into a media stream. Media content may be defined as one media content period or a contiguous sequence of media content periods. Media content component type may be defined as a single type of media content such as audio, video, or text. A media stream may be defined as an encoded version of a media content component.

In DASH, a hierarchical data model is used to structure a media presentation as follows. A media presentation consists of a sequence of one or more Periods, each Period contains one or more Groups, each Group contains one or more Adaptation Sets, each Adaptation Sets contains one or more Representations, each Representation consists of one or more Segments. A Group may be defined as a collection of Adaptation Sets that are not expected to be presented simultaneously. An Adaptation Set may be defined as a set of interchangeable encoded versions of one or several media content components. A Representation is one of the alternative choices of the media content or a subset thereof typically differing by the encoding choice, such as by bitrate, resolution, language, codec, or the like, for example. The Segment contains a certain duration of media data, and metadata to decode and present the included media content. A Segment is identified by a URI and can typically be requested by a HTTP GET request. A Segment may be defined as a unit of data associated with an HTTP-URL and optionally a byte range that are specified by an MPD.

The DASH MPD complies with Extensible Markup Language (XML) and is therefore specified through elements and attributes as defined in XML. The MPD may be specified using the following conventions: Elements in an XML document may be identified by an upper-case first letter and may appear in bold face as Element. To express that an element Element1 is contained in another element Element2, one may write Element2.Element1. If an element's name consists of two or more combined words, camel-casing may be used, such as ImportantElement, for example. Elements may be present either exactly once, or the minimum and maximum occurrence may be defined by <minOccurs> . . . <maxOccurs>. Attributes in an XML document may be identified by a lower-case first letter as well as they may be preceded by a '@'-sign, e.g. @attribute, for example. To point to a specific attribute @ attribute contained in an element, one may write Element@attribute. If an attribute's name consists of two or more combined words, camel-casing may be used after the first word, such as @veryImportantAttribute, for example. Attributes may have assigned a status in the XML as mandatory (M), optional (O), optional with default value (OD) and conditionally mandatory (CM).

In DASH, all descriptor elements are typically structured in the same way, in that they contain a @ schemeIdUri attribute that provides a URI to identify the scheme and an optional attribute @value and an optional attribute @id. The semantics of the element are specific to the scheme employed. The URI identifying the scheme may be a URN or a URL. Some descriptors are specified in MPEG-DASH (ISO/IEC 23009-1), while descriptors can additionally or alternatively be specified in other specifications. When specified in specifications other than MPEG-DASH, the MPD does not provide any specific information on how to use descriptor elements. It is up to the application or specification that employs DASH formats to instantiate the description elements with appropriate scheme information. Applications or specifications that use one of these elements define a Scheme Identifier in the form of a URI and the value space for the element when that Scheme Identifier is used. The Scheme Identifier appears in the @schemeIdUri attribute. In the case that a simple set of enumerated values are required, a text string may be defined for each value and this string may be included in the @value attribute. If structured data is required then any extension element or attribute may be defined in a separate namespace. The @id value may be used to refer to a unique descriptor or to a group of descriptors. In the latter case, descriptors with identical values for the attribute @id may be required to be synonymous, i.e. the processing of one of the descriptors with an identical value for @id is sufficient. Two elements of type DescriptorType are equivalent, if the element name, the value of the @schemeIdUri and the value of the @value attribute are equivalent. If the @ schemeIdUri is a URN, then equivalence may refer to lexical equivalence as defined in clause 5 of RFC 2141. If the @schemeIdUri is a URL, then equivalence may refer to equality on a character-for-character basis as defined in clause 6.2.1 of RFC3986. If the @value attribute is not present, equivalence may be determined by the equivalence for @ schemeIdUri only. Attributes and element in extension namespaces might not be used for determining equivalence. The @id attribute may be ignored for equivalence determination.

MPEG-DASH specifies descriptors EssentialProperty and SupplementalProperty. For the element EssentialProperty the Media Presentation author expresses that the successful processing of the descriptor is essential to properly use the information in the parent element that contains this descriptor unless the element shares the same @id with another EssentialProperty element. If EssentialProperty elements share the same @id, then processing one of the EssentialProperty elements with the same value for @id is sufficient. At least one EssentialProperty element of each distinct @id value is expected to be processed. If the scheme or the value for an EssentialProperty descriptor is not recognized the DASH client is expected to ignore the parent element that contains the descriptor. Multiple EssentialProperty elements with the same value for @id and with different values for @id may be present in an MPD.

For the element SupplementalProperty the Media Presentation author expresses that the descriptor contains supplemental information that may be used by the DASH client for optimized processing. If the scheme or the value for a SupplementalProperty descriptor is not recognized the DASH client is expected to ignore the descriptor. Multiple SupplementalProperty elements may be present in an MPD.

SRD (Spatial Relationship Description) is specified in the normative Annex H of MPEG-DASH. The following contains some excerpts of the SRD specification.

The SRD scheme allows Media Presentation Description authors to express spatial relationships between Spatial Objects. A Spatial Object is represented by either an Adaptation Set or a Sub-Representation. As an example, a spatial relationship may express that a video represents a spatial part of another full-frame video (e.g. a region of interest, or a tile).

The SupplementalProperty and/or EssentialProperty descriptors with @schemeIdUri equal to "urn:mpeg:dash:srd:2014" are used to provide spatial relationship information associated to the containing Spatial Object. SRD shall be contained exclusively in these two MPD elements (AdaptationSet and SubRepresentation).

Sub-Representation level SRDs may be used to represent Spatial Objects in one Representation such as HEVC tiling streams. In that case, SRD descriptors may be present at Adaptation Set as well as Sub-Representation levels.

The @value of the SupplementalProperty or EssentialProperty elements using the SRD scheme is a comma separated list of values for SRD parameters. The SRD parameters source_id, object_x, object_y, object_width, and object_height are required to be present and the SRD parameters total_width, total_height, and spatial_set_id are conditionally or optionally present.

source_id is a non-negative integer in decimal representation providing the identifier for the source of the content. The source_id parameter provides a unique identifier, within the Period, for the source of the content. It implicitly defines a coordinate system associated to this source. This coordinate system uses an arbitrary origin (0; 0); the x-axis is oriented from left to right and the y-axis from top to bottom.

All SRD sharing the same source_id value have the same origin and axes orientations. Spatial relationships for Spatial Objects using SRD with different source_id values are undefined.

For a given source_id value, a reference space is defined, corresponding to the rectangular region encompassing the entire source content, whose top-left corner is at the origin of the coordinate system. The total_width and total_height values in a SRD provide the size of this reference space expressed in arbitrary units. total_width is a non-negative integer in decimal representation expressing the width of the reference space in arbitrary units. total_height is a non-negative integer in decimal representation expressing the height of the reference space in arbitrary units. It is allowed that there is no Spatial Object in the MPD that covers the entire source of the content, e.g. when the entire source content is represented by two separate videos.

object_x is a non-negative integer in decimal representation expressing the horizontal position of the top-left corner of the Spatial Object in arbitrary units. object_y is a non-negative integer in decimal representation expressing the vertical position of the top-left corner of the Spatial Object in arbitrary units. object_width is a non-negative integer in decimal representation expressing the width of the Spatial Object in arbitrary units. object_height is a non-negative integer in decimal representation expressing the height of the Spatial Object in arbitrary units. The object_x and object_y parameters (respectively object_width and object_height) express 2D positions (respectively 2D sizes) of the associated Spatial Object in the coordinate system associated to the source. The values of the object_x, object_y, object_width, and object_height parameters are relative to the values of the total_width and total_height parameters, as defined above. Positions (object_x, object_y) and sizes (object_width, object_height) of SRDs sharing the same source_id value may be compared after taking into account the size of the reference space, i.e. after the object_x and object_width values are divided by the total_width value and the object_y and object_height values divided by the total_height value of their respective descriptors. Different total_width and total_height values may be used in different descriptors to provide positions and sizes information in different units for the same reference space.

spatial_set_id is a non-negative integer in decimal representation providing an identifier for a group of Spatial Objects. When not present, the Spatial Object associated to this descriptor does not belong to any spatial set and no spatial set information is given. MPD authors can express, using the spatial_set_id parameter, that some Spatial Objects, within a given source_id, have a particular spatial relationship. For instance, an MPD author may group all Adaptation Sets corresponding to tiles at a same resolution level. This way, the spatial_set_id parameter may be used by the DASH client to quickly select spatially related Spatial Objects.

An Initialization Segment may be defined as a Segment containing metadata that is necessary to present the media streams encapsulated in Media Segments. In ISOBMFF based segment formats, an Initialization Segment may comprise the Movie Box ('moov') which might not include metadata for any samples, i.e. any metadata for samples is provided in 'moof' boxes.

A Media Segment contains certain duration of media data for playback at a normal speed, such duration is referred as Media Segment duration or Segment duration. The content producer or service provider may select the Segment duration according to the desired characteristics of the service.

For example, a relatively short Segment duration may be used in a live service to achieve a short end-to-end latency. The reason is that Segment duration is typically a lower bound on the end-to-end latency perceived by a DASH client since a Segment is a discrete unit of generating media data for DASH. Content generation is typically done such a manner that a whole Segment of media data is made available for a server. Furthermore, many client implementations use a Segment as the unit for GET requests. Thus, in typical arrangements for live services a Segment can be requested by a DASH client only when the whole duration of Media Segment is available as well as encoded and encapsulated into a Segment. For on-demand service, different strategies of selecting Segment duration may be used.

A Segment may be further partitioned into Subsegments to enable downloading segments in multiple parts, for example. Subsegments may be required to contain complete access units. Subsegments may be indexed by Segment Index box, which contains information to map presentation time range and byte range for each Subsegment. The Segment Index box may also describe subsegments and stream access points in the segment by signaling their durations and byte offsets. A DASH client may use the information obtained from Segment Index box(es) to make a HTTP GET request for a specific Subsegment using byte range HTTP request. If a relatively long Segment duration is used, then Subsegments may be used to keep the size of HTTP responses reasonable and flexible for bitrate adaptation. The indexing information of a segment may be put in the single box at the beginning of that segment or spread among many indexing boxes in the segment. Different methods of spreading are possible, such as hierarchical, daisy chain, and hybrid, for example. This technique may avoid adding a large box at the beginning of the segment and therefore may prevent a possible initial download delay.

Sub-Representations are embedded in regular Representations and are described by the SubRepresentation element. SubRepresentation elements are contained in a Representation element. The SubRepresentation element describes properties of one or several media content components that are embedded in the Representation. It may for example describe the exact properties of an embedded audio component (such as codec, sampling rate, etc., for example), an embedded sub-title (such as codec, for example) or it may describe some embedded lower quality video layer (such as some lower frame rate, or otherwise, for example). Sub-Representations and Representation share some common attributes and elements. In case the @level attribute is present in the SubRepresentation element, the following applies:

Sub-Representations provide the ability for accessing a lower quality version of the Representation in which they are contained. In this case, Sub-Representations for example allow extracting the audio track in a multiplexed Representation or may allow for efficient fast-forward or rewind operations if provided with lower frame rate;

The Initialization Segment and/or the Media Segments and/or the Index Segments shall provide sufficient information such that the data can be easily accessed through HTTP partial GET requests. The details on providing such information are defined by the media format in use.

When ISOBMFF Segments are used, the following applies:
The Initialization Segment contains the Level Assignment box.
The Subsegment Index box ('ssix') is present for each Subsegment.

The attribute @level specifies the level to which the described Sub-Representation is associated to in the Subsegment Index. The information in Representation, Sub-Representation and in the Level Assignment ('leva') box contains information on the assignment of media data to levels.

Media data should have an order such that each level provides an enhancement compared to the lower levels.

If the @level attribute is absent, then the SubRepresentation element is solely used to provide a more detailed description for media streams that are embedded in the Representation.

The ISOBMFF includes the so-called level mechanism to specify subsets of the file.

Levels follow the dependency hierarchy so that samples mapped to level n may depend on any samples of levels m, where m<=n, and do not depend on any samples of levels p, where p>n. For example, levels can be specified according to temporal sub-layer (e.g., TemporalId of HEVC). Levels may be announced in the Level Assignment ('leva') box contained in the Movie Extends ('mvex') box. Levels cannot be specified for the initial movie. When the Level Assignment box is present, it applies to all movie fragments subsequent to the initial movie. For the context of the Level Assignment box, a fraction is defined to consist of one or more Movie Fragment boxes and the associated Media Data boxes, possibly including only an initial part of the last Media Data Box. Within a fraction, data for each level appears contiguously. Data for levels within a fraction appears in increasing order of level value. All data in a fraction is assigned to levels. The Level Assignment box provides a mapping from features, such as scalability layers or temporal sub-layers, to levels. A feature can be specified through a track, a sub-track within a track, or a sample grouping of a track. For example, the Temporal Level sample grouping may be used to indicate a mapping of the pictures to temporal levels, which are equivalent to temporal sub-layers in HEVC. That is, HEVC pictures of a certain Temporand value may be mapped to a particular temporal level using the Temporal Level sample grouping (and the same can be repeated for all Temporand values). The Level Assignment box can then refer to the Temporal Level sample grouping in the indicated mapping to levels.

The Subsegment Index box ('ssix') provides a mapping from levels (as specified by the Level Assignment box) to byte ranges of the indexed subsegment. In other words, this box provides a compact index for how the data in a subsegment is ordered according to levels into partial subsegments. It enables a client to easily access data for partial subsegments by downloading ranges of data in the subsegment. When the Subsegment Index box is present, each byte in the subsegment is assigned to a level. If the range is not associated with any information in the level assignment, then any level that is not included in the level assignment may be used. There is 0 or 1 Subsegment Index boxes present per each Segment Index box that indexes only leaf subsegments, i.e. that only indexes subsegments but no segment indexes. A Subsegment Index box, if any, is the next box after the associated Segment Index box. A Subsegment Index box documents the subsegment that is indicated in the immediately preceding Segment Index box. Each level may be assigned to exactly one partial subsegment, i.e. byte ranges for one level are contiguous. Levels of partial subsegments are assigned by increasing numbers within a subsegment, i.e., samples of a partial subsegment may depend on any samples of preceding partial subsegments in the same subsegment, but not the other way around.

For example, each partial subsegment contains samples having an identical temporal sub-layer and partial subsegments appear in increasing temporal sub-layer order within the subsegment. When a partial subsegment is accessed in this way, the final Media Data box may be incomplete, that is, less data is accessed than the length indication of the Media Data Box indicates is present. The length of the Media Data box may need adjusting, or padding may be used. The padding_flag in the Level Assignment Box indicates whether this missing data can be replaced by zeros. If not, the sample data for samples assigned to levels that are not accessed is not present, and care should be taken.

MPEG-DASH defines segment-container formats for both ISOBMFF and MPEG-2 Transport Streams. Other specifications may specify segment formats based on other container formats. For example, a segment format based on Matroska container file format has been proposed and may be summarized as follows. When Matroska files are carried as DASH segments or alike, the association of DASH units and Matroska units may be specified as follows. A subsegment (of DASH) may be defined as one or more consecutive Clusters of Matroska-encapsulated content. An Initialization Segment of DASH may be required to comprise the EBML header, Segment header (of Matroska), Segment Information (of Matroska) and Tracks, and may optionally comprise other level1 elements and padding. A Segment Index of DASH may comprise a Cues Element of Matroska.

OMAF defines MPEG-DASH elements for associating various DASH elements. A SupplementalProperty element with a @schemeIdUri attribute equal to "urn:mpeg:mpegI: omaf:2018:assoc" is referred to as an association descriptor. One or more association descriptors may be present at adaptation set level, representation level, preselection level. An association descriptor included inside an adaptation set/representation/preselection element indicates that the parent element of this element's descriptor (i.e. adaptation set/representation/preselection element) is associated with one or more elements in the MPD indicated by the XPath query in the omaf2:Association element and the association type signalled by omaf2: @associationKindList.

Currently the MPEG OMAF specification does not support means for other applications to be "visible" within the VR content consumption environment. In addition, there are no means for a user to receive an incoming interaction message (e.g., SMS, chat message), voice call or audio-visual call from other users. Therefore, VR content consumption is prone to disruptions if not handled properly, and the inability to handle such non-OMAF-content driven simulations inhibits VR content consumption.

The present embodiments provide an interface for the integration of external applications with the immersive media consumption. The external interface definition provides a placeholder for consuming external application content within the immersive media environment.

Figure 2:
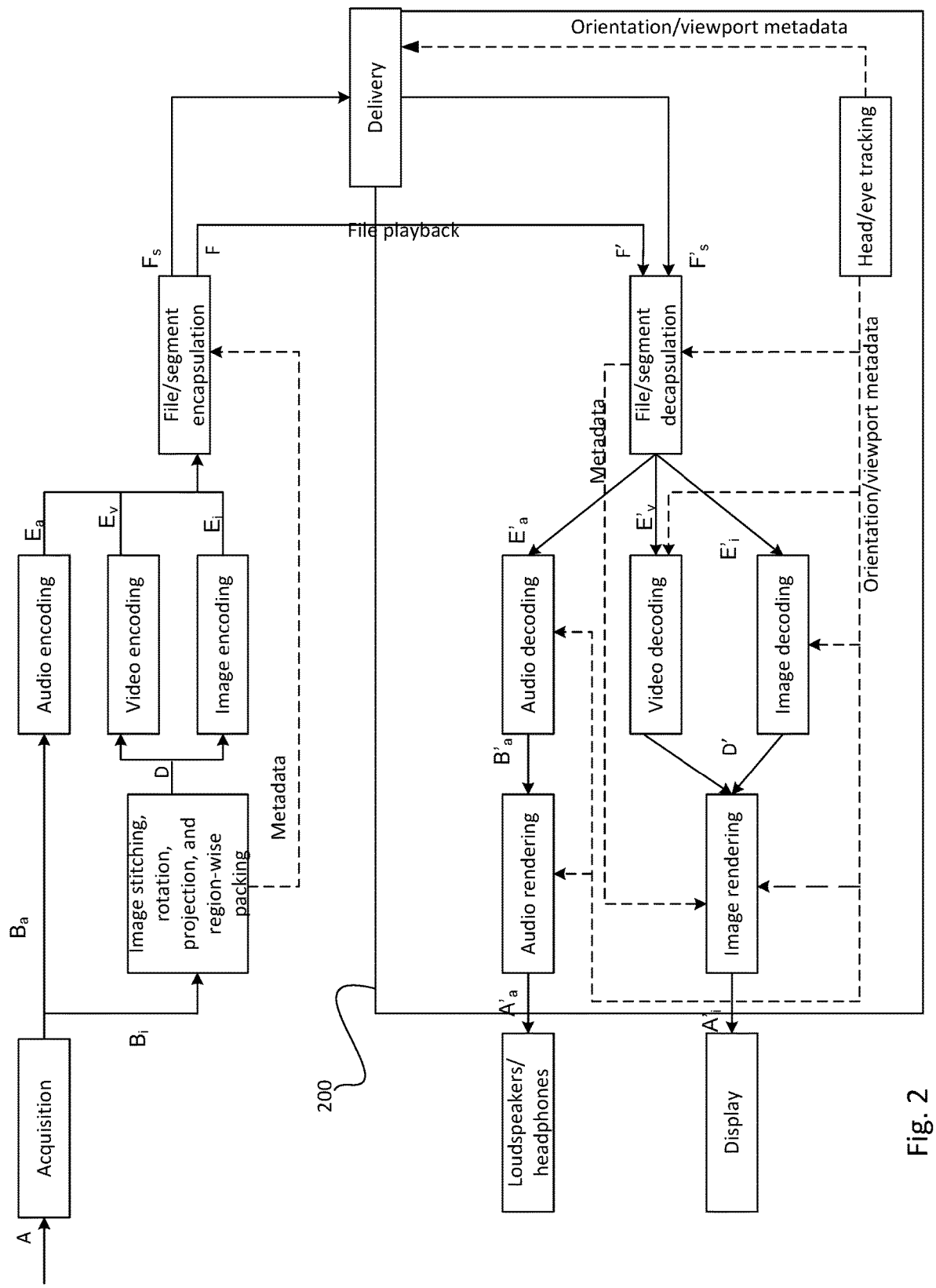
FIG. 2 shows a system overview of an OMAF.
Figure 3:
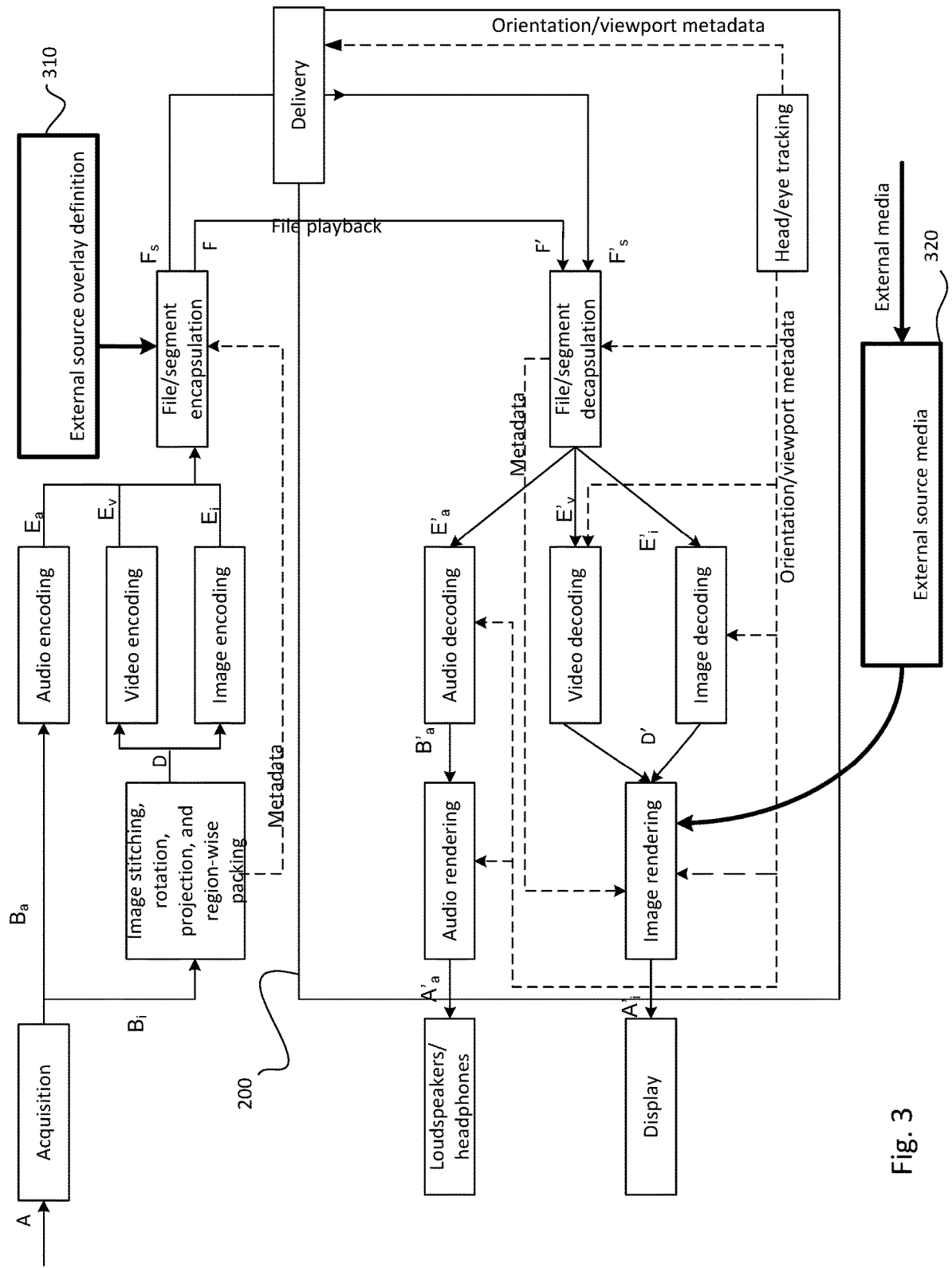
FIG. 3 shows a system overview of an OMAF according to present embodiments.
Figure 6:
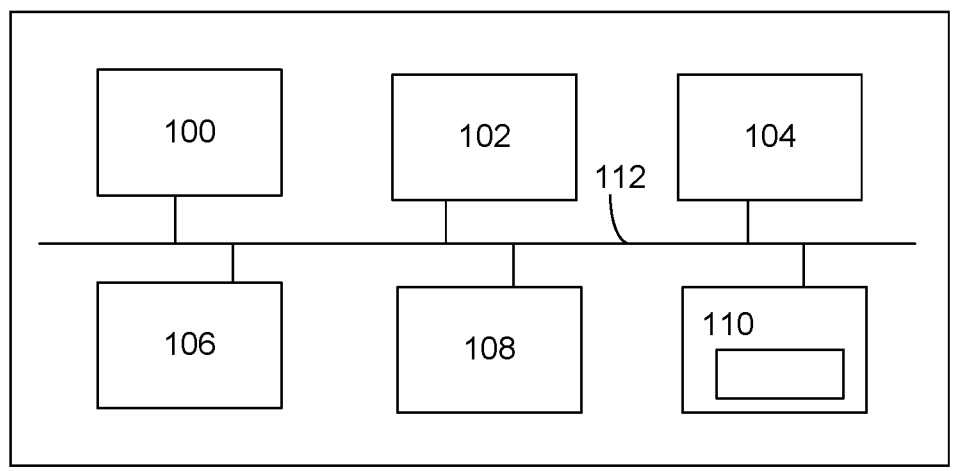
FIG. 6 shows an apparatus according to an embodiment.

FIG. 2 illustrates the OMAF system architecture. FIG. 3 illustrates the OMAF system architecture according to the present embodiments.

As shown in FIG. 2, an omnidirectional media (A) is acquired. The omnidirectional media comprises image data ($B_i$) and audio data ($B_a$), which are processed separately.

In image stitching, rotation, projection and region-wise packing, the images/video of the source media and provided as input ($B_i$) are stitched to generate a sphere picture on a unit sphere per the global coordinate axel. The unit sphere is then rotated relative to the global coordinate axes. The amount of rotation to convert from the local coordinate axes to the global coordinate axes may be specified by the rotation angles indicated in a RotationBox. The local coordinate axes of the unit sphere are the axes of the coordinate system that has been rotated. The absence of the RotationBox indicates that the local coordinate axes are the same as the global coordinate axes. Then, the spherical picture on the rotated unit sphere is converted to a two-dimensional projected picture, for example using the equirectangular projection. When spatial packing of stereoscopic content is applied, two spherical pictures for the two views are converted to two constituent pictures, after which frame packing is applied to pack the two constituent picture on one projected picture. Rectangular region-wise packing can then be applied to obtain a packed picture from the projected picture. The packed pictures (D) are then provided for video and image encoding to result in encoded image ($E_i$) and/or encoded video stream ($E_v$).

The audio of the source media is provided as input ($B_a$) to audio encoding that provides as an encoded audio ($E_a$).

The encoded data ($E_i$, $E_v$, $E_a$) are then encapsulated into file for playback (F) and delivery (i.e. streaming) ($F_s$).

In the OMAF player 200, a file decapsulator processes the files (F', $F'_s$) and extracts the coded bitstreams $E'_i$, $E'_v$, $E'_a$) and parses the metadata. The audio, video and/or images are then decoded into decoded data (D', $B'_a$). The decoded pictures (D') are projected onto a display according to the viewport and orientation sensed by a head/eye tracking device. Similarly, the decoded audio ($B'_a$) is rendered through loudspeakers/headphones.

The system architecture of FIG. 3 is based on that of FIG. 2 with additional elements. For example, external source overlay definition 310 is encapsulated into the file(s) (F, $F_s$) as metadata. The external source overlay definition 310 specifies where and how an external media is to be overlaid on the omnidirectional content during rendering. Metadata on the external source overlay definition is signaled via the file/segment delivered to the player.

With this respect, the OMAF player 200 receives external source media 320 for image rendering process. The external source media can be, but is not limited to, an advertisement, video telephone/chat/conferencing, e.g. complying with a 3 GPP Multimedia Telephone Service for IP Multimedia Subsystem (MTSI) or any vendor-driven service such as FaceTime, a pass-through window for augmented reality (AR), a message notification, etc. The external source media 320 is inserted in the VR scene with compatible format and temporal synchronization (when possible) during image rendering according to the external source overlay definition. Metadata related to external overlay is used in the rendering step to position and render the media obtained from the external source.

According to an embodiment, an encoding method comprises indicating in a bitstream or in a container file or in a manifest or in a generic communication protocol at least Overlay placement information for the external media source. Overlay placement information may e.g. comprise a placeholder coordinates, such as placeholder picture width, height, depth and orientation (e.g. defined as yaw, pitch and roll) for an external media to be overlaid on the immersive media during rendering.

The encoding method may also comprise indicating in a bitstream or in a container file or in a manifest or in a generic communication protocol;

a permissible temporal synchronization skew between the immersive media and the external application media;
permissible update frequency (e.g., a picture frame rate);
parameters defining the purpose of the overlay;
permissible interactions with the external application media.

According to an embodiment, a decoding method comprises parsing from a bitstream or in a container file or in a manifest or in a generic communication protocol at least Overlay placement information for the external media source. Overlay placement information may e.g. comprise a placeholder coordinates, such as placeholder picture width, height, depth and orientation (e.g. defined as yaw, pitch and roll);

The decoding method may also comprises indicating in a bitstream or in a container file or in a manifest or in a generic communication protocol a permissible temporal synchronization skew between the immersive media and the external application media;
    permissible update frequency (e.g., a picture frame rate);
    parameters defining the purpose of the overlay;
    permissible interactions with the external application media.

The placeholder picture width, height and depth may be dynamic and not static, and can be changed during the session, i.e., the presentation. The information on the width, height and depth can be stored into a timed metadata track.

The external source overlay definition 310 may comprise a new control structure which describes an overlay with external source content 320. Therefore, the OMAF content delivered to the application may have its own delivery mechanism specified in DASH. The delivery and decoding of the external source content is to be managed by the application, whereupon that may not be a responsibility of OMAF. Consequently, OMAF does not need to know if the external media content is non-OMAF-compliant codec or format.

The permissible temporal synchronization skew being indicated in the bitstream can be used to inform the application about the synchronization requirement.

The permissible update frequency can be indicated in the bitstream, since that might have an impact on the overall application resource consumption as well as rendering experience.

The control parameters which describe the purpose of the overlay (for example, if the overlay will contain a pass-through video for real-world keyhole in OMAF content, MTSI/FaceTime/Social VR video) may comprise, but might not be limited to, one or more of the following:

| Purpose of the overlay | Application |
|---|---|
| 1 | Pass-through content with keyhole to the real world |
| 2 | MTSI content |
| 3 | Face time content |
| 4 | Ad content |
| 5 | Social VR content |
| 6 | Message notifications |
| 7 | Single picture content |

It is to be noticed that the embodiments described here are not limiting the applicability of the present solution. For example, the solution is applicable also for a single picture and therefore in the MPEG HEIF specification, as well as the solution is applicable in point cloud coding media streams. Streaming media is not limited to the MPEG DASH protocol but can also include real-time low delay uni-directional or bi-directional media communication and covering different network topologies such as point-to-point, point-to-multi-point, peer-to-peer and use any communication protocol at any of the ISO OSI protocol layers.

ISOBMFF example for signaling the external interface for immersive media according to present embodiments is discussed in the following:

```
Source region for the overlay
aligned(8) class OverlaySourceRegion( ) {
    unsigned int(1) ext_overlaysourceregion
    if(!ext_overlaysourceregion){
        unsigned int(16) packed_picture_width;
        unsigned int(16) packed_picture_height;
        unsigned int(16) packed_reg_width;
        unsigned int(16) packed_reg_height;
        unsigned int(16) packed_reg_top;
        unsigned int(16) packed_reg_left;
        unsigned int(3) transform_type;
        bit(4) reserved = 0;
    } else {
        unsigned int(16) picture_width;
        unsigned int(16) picture_height;
        unsigned int(16) picture_depth;
        unsigned int(16) picture_orientation_yaw;
        unsigned int(16) picture_orientation_pitch;
        unsigned int(16) picture_orientation_roll;
        unsigned int(3) transform_type; // Defined as currently in
        OMAF.
        signed int(16) synchOffset;
        unsigned int(1) update_rate;
        signed int(4) overlayPurpose;
        bit (7) reserved = 0;
    }
}
```

In the previous ext_overlaysourceregion flag indicates that the content to be rendered in this overlay is provided by an external application and not extracted from the OMAF bit stream.

picture_width, picture_height and picture_depth specify the width, height and depth of the external overlay source picture.

picture_orientation_yaw, picture_orientation_pitch and picture_orientation_roll specify the yaw, pitch and roll for the external overlay source picture.

synchOffset specifies the synchronization offset required between the background immersive content and the external source content, with reference to the background media sampling rate. The unit may be expressed in time (e.g., milliseconds (ms)) or number of samples. The value 0 indicates best effort synchronization.

update_rate specifies update frequency of the externals source content. The value 1 indicates frequency of update in synch with the background content update frequency while 0 indicate that it can be different from the background update rate.

overlayPurpose specifies the purpose of the overlay according to the table above.

An alternative example of ISOBMFF for signaling the external interface for immersive media according to present embodiments is discussed in the following:

```
Syntax for External source overlay
aligned(8) class ExternalSourceOverlay( ) {
    unsigned int(16) picture_width;
    unsigned int(16) picture_height;
    unsigned int(3) transform_type;
    signed int(16) sampleOffset;
```

```
        unsigned int(1) update_rate;
        bit(4) reserved = 0;
}
``` transform_type specifies the rotation and mirroring that is applied to the overlay source to remap it for displaying. The following values are specified:
- 0: no transform
- 1: mirroring horizontally
- 2: rotation by 180 degrees (counter-clockwise)
- 3: rotation by 180 degrees (counter-clockwise) before mirroring horizontally
- 4: rotation by 90 degrees (counter-clockwise) before mirroring horizontally
- 5: rotation by 90 degrees (counter-clockwise)
- 6: rotation by 270 degrees (counter-clockwise) before mirroring horizontally
- 7: rotation by 270 degrees (counter-clockwise)

Another alternative example of ISOBMFF for signaling the external interface for immersive media according to present embodiments is discussed in the following:

```
aligned(8) class ExternalSourceOverlay( ) {
}
```

When ExternalSourceOverlay is associated with an overlay, it indicates that the content for the overlay is provided by an external source.

It is to be noted that when the external source for overlay is not a projected omnidirectional video track or image item, the OMAF player is able to treat each decoded picture as a texture atlas.

It needs to be understood that the above syntax examples for indicating an external source are presented as exemplary embodiments and other similar embodiments can likewise be generated. Any syntax that indicates an external source being used to provide the visual content for an overlay may be accompanied by overlay placement information, which may be indicated as described earlier.

It may be required that only one source is indicated for a single overlay. The source may for example be an entire image or track, a region within an image or pictures of track, a recommended viewport, or an external source.

The semantics for an entity group for overlay and background visual media ('ovbg') can be the following:

```
aligned(8) class OverlayAndBackgroundGroupingBox(version, flags)
extends EntityToGroupBox('ovbg', version, flags) {
    for(i=0; i<num_entities_in_group; i++) {
        bit(6) reserved = 0;
        unsigned int(1) overlay_flag[i];
        unsigned int(1) backgroud_flag[i];
    }
}
```

If both of overlay_flag[i] and background_flag[i] are equal to 1, and the overlay_control_flag[10] is equal to 1, then it may be indicated that the overlay uses external media as the source. The external source overlay may be associated with a background, and it can have properties like any other overlay.

User interaction controls defined for the external source overlay may take the higher priority due to which the user may be limited in interacting with the external source overlay. According to another embodiment, the external source overlay may have its own set of user interaction controls which may override the user interaction controls defined in OMAF overlay control structure.

In previous an interface for the integration of external applications with the immersive media consumption has been discussed.

FIG. 4 is a flowchart illustrating a method according to an embodiment. A method comprises generating a bitstream defining a presentation, the presentation comprising an omnidirectional visual media content; and indicating in the bitstream a definition for an external media to be overlaid on the omnidirectional visual media content during rendering; wherein the definition comprises at least an overlay placement information for the external media on the omnidirectional visual media content.

An apparatus according to an embodiment comprises means for generating a bitstream defining a presentation, the presentation comprising an omnidirectional visual media content; and means for indicating in the bitstream a definition for an external media to be overlaid on the omnidirectional visual media content during rendering; wherein the definition comprises at least an overlay placement information for the external media on the omnidirectional visual media content. The means comprises at least one processor, and a memory including a computer program code, wherein the processor may further comprise processor circuitry. The memory and the computer program code are configured to, with the at least one processor, cause the apparatus to perform the method of FIG. 4 according to various embodiments.

FIG. 5 is a flowchart illustrating a method according to another embodiment. A method comprises determining from a bitstream a presentation, the presentation comprising an omnidirectional visual media content; and parsing from the bitstream a definition for an external media to be overlaid on the omnidirectional visual media content during rendering; wherein the definition comprises at least an overlay placement information for the external media on the omnidirectional visual media content.

An apparatus according to an embodiment comprises means for determining from a bitstream a presentation, the presentation comprising an omnidirectional visual media content; and means parsing from the bitstream a definition for an external media to be overlaid on the omnidirectional visual media content during rendering; wherein the definition comprises at least an overlay placement information for the external media on the omnidirectional visual media content. The means comprises at least one processor, and a memory including a computer program code, wherein the processor may further comprise processor circuitry. The memory and the computer program code are configured to, with the at least one processor, cause the apparatus to perform the method of FIG. 5 according to various embodiments.

Some embodiments have been described above with reference to the term OMAF player. It needs to be understood that embodiments similarly apply to any virtual reality media player or 360-degree video player or alike.

The various embodiments can be implemented with the help of computer program code that resides in a memory and causes the relevant apparatuses to carry out the method. For example, a device may comprise circuitry and electronics for handling, receiving and transmitting data, computer program code in a memory, and a processor that, when running the computer program code, causes the device to carry out the features of an embodiment. Yet further, a network device like a server may comprise circuitry and electronics for handling, receiving and transmitting data, computer program code in a memory, and a processor that, when running the computer program code, causes the network device to carry out the features of an embodiment. The computer program code comprises one or more operational characteristics. According to an embodiment, said operational characteristics are being defined through configuration by said computer based on the type of said processor, wherein a system is connectable to said processor by a bus, wherein a programmable operational characteristic of the system comprises generating a bitstream defining a presentation, the presentation comprising an omnidirectional visual media content; and indicating in the bitstream a definition for an external media to be overlaid on the omnidirectional visual media content during rendering; wherein the definition comprises at least an overlay placement information for the external media on the omnidirectional visual media content. According to another embodiment, said operational characteristics are being defined through configuration by said computer based on the type of said processor, wherein a system is connectable to said processor by a bus, wherein a programmable operational characteristic of the system comprises determining from a bitstream a presentation, the presentation comprising an omnidirectional visual media content; and parsing from the bitstream a definition for an external media to be overlaid on the omnidirectional visual media content during rendering; wherein the definition comprises at least an overlay placement information for the external media on the omnidirectional visual media content.

If desired, the different functions discussed herein may be performed in a different order and/or concurrently with other. Furthermore, if desired, one or more of the above-described functions and embodiments may be optional or may be combined.

Although various aspects of the embodiments are set out in the independent claims, other aspects comprise other combinations of features from the described embodiments and/or the dependent claims with the features of the independent claims, and not solely the combinations explicitly set out in the claims.

It is also noted herein that while the above describes example embodiments, these descriptions should not be viewed in a limiting sense. Rather, there are several variations and modifications, which may be made without departing from the scope of the present disclosure as, defined in the appended claims.

The invention claimed is:

1. A method, comprising:
generating a bitstream defining a presentation, the presentation comprising an omnidirectional visual media content; and
indicating in the bitstream a definition for an external media, based on content creator control of externally sourced overlay rendering, to be overlaid on the presentation comprising the omnidirectional visual media content during rendering, where the external media is external to the bitstream defining the presentation;
wherein the definition comprises at least an overlay placement information for the external media on the presentation comprising the omnidirectional visual media content.

2. The method according to claim 1, further comprising indicating in the bitstream one or more of the following:
a permissible temporal synchronization skew between the omnidirectional visual media content and the external media;
a permissible update frequency;
parameters defining a purpose of the overlay; or
permissible interactions with the external media.

3. The method according to claim 1, wherein the overlay placement information comprises information on at least one of the following: a size of an overlay; a location of an overlay; an orientation of the overlay; a layering order of the overlay in relation to other overlays; and/or a background media.

4. The method of claim 1, where the external media is an application external to the bitstream defining the presentation.

5. The method of claim 4, where the application external to the bitstream defining the presentation is an interactive software application.

6. The method of claim 1, wherein the externally sourced overlay comprises a set of user interaction controls used in combination with user interaction controls defined in an omnidirectional media format used with the bitstream to render the presentation comprising the omnidirectional visual media content.

7. The method of claim 1, wherein the externally sourced content is two dimensional rectilinear content.

8. The method of claim 1, wherein the externally sourced content complies with a multimedia telephone service for internet protocol multimedia subsystem, and the externally sourced content is delivered as a session description protocol.

9. A method, comprising:
determining from a bitstream a presentation, the presentation comprising an omnidirectional visual media content; and
parsing from the bitstream a definition for an external media, based on content creator control of externally sourced overlay rendering, to be overlaid on the presentation comprising the omnidirectional visual media content during rendering, where the external media is external to the bitstream defining the presentation;
wherein the definition comprises at least an overlay placement information for the external media on the presentation comprising the omnidirectional visual media content.

10. The method according to claim 9, further comprising parsing from the bitstream one or more of the following:
a permissible temporal synchronization skew between the omnidirectional visual media content and the external media;
a permissible update frequency;
parameters defining a purpose of the overlay; or
permissible interactions with the external media.

11. The method according to claim 9,
wherein the overlay placement information comprises information on at least one of the following: a size of an overlay; a location of an overlay; an orientation of the overlay; a layering order of the overlay in relation to other overlays; and/or a background media; and wherein the overlay placement information comprises one or more of the following:
a placement locking type;
a position and a size of the overlay relative to a viewport; information indicative of stereoscopic rendering;
a position and a size of the overlay relative to a sphere;
depth or distance of a surface on which the overlay is rendered;
rotation of the overlay relative to the surface, a plane, or a window on which the overlay is rendered; and/or
a layering order.

12. The method according to claim 11, further comprising parsing the size of the overlay from a timed metadata track, wherein the size of the overlay is dynamic and is changed during the presentation.

13. An apparatus comprising
at least one processor; and
at least one non-transitory memory including computer program code;
the at least one memory and the computer program code configured to, with the at least one processor, cause the apparatus at least to perform:
generate a bitstream defining a presentation, the presentation comprising an omnidirectional visual media content; and
indicate in the bitstream a definition for an external media, based on content creator control of externally sourced overlay rendering, to be overlaid on the presentation comprising the omnidirectional visual media content during rendering, where the external media is external to the bitstream defining the presentation;
wherein the definition comprises at least an overlay placement information for the external media on the presentation comprising the omnidirectional visual media content.

14. The apparatus according to claim 13, wherein the apparatus is further caused to indicate in the bitstream one or more of the following:
a permissible temporal synchronization skew between the omnidirectional visual media content and the external media;
a permissible update frequency;
parameters defining a purpose of the overlay; or
permissible interactions with the external media.

15. The apparatus according to claim 13,
wherein the overlay placement information comprises information on at least one of the following: a size of an overlay; a location of an overlay; an orientation of the overlay; a layering order of the overlay in relation to other overlays; and/or a background media;
wherein the overlay placement information comprises one or more of the following:
placement locking type;
position and size of the overlay relative to a viewport;
information indicative of stereoscopic rendering;
position and size of the overlay relative to a sphere;
depth or distance of a surface on which the overlay is rendered;
rotation of the overlay relative to the surface, plane, or window on which the overlay is rendered; or
layering order.

16. The apparatus according to claim 15, wherein the size of the overlay is dynamic to be changed during a presentation, wherein the size of the overlay is stored as a timed metadata track.

17. An apparatus comprising
at least one processor; and
at least one non-transitory memory including computer program code;
the at least one memory and the computer program code configured to, with the at least one processor, cause the apparatus at least to perform:
determine from a bitstream a presentation, the presentation comprising an omnidirectional visual media content; and
parse from the bitstream a definition for an external media, based on content creator control of externally sourced overlay rendering, to be overlaid on the presentation comprising the omnidirectional visual media content during rendering, where the external media is external to the bitstream defining the presentation;
wherein the definition comprises at least an overlay placement information for the external media on the presentation comprising the omnidirectional visual media content.

18. The apparatus according to claim 17, wherein the apparatus is further caused to parse from the bitstream one or more of the following:
a permissible temporal synchronization skew between the omnidirectional visual media content and the external media;
a permissible update frequency;
parameters defining a purpose of the overlay; or
permissible interactions with the external media.

19. The apparatus according to claim 17,
wherein the overlay placement information comprises information on at least one of the following: a size of an overlay; a location of an overlay; an orientation of the overlay; a layering order of the overlay in relation to other overlays; and/or a background media;
wherein the overlay placement information comprises one or more of the following:
placement locking type;
position and size of the overlay relative to a viewport;
information indicative of stereoscopic rendering;
position and size of the overlay relative to a sphere;
depth or distance of a surface on which the overlay is rendered;
rotation of the overlay relative to the surface, plane, or window on which the overlay is rendered; or
layering order.

20. A computer readable medium comprising program instructions for causing an apparatus to perform at least the following:
generate a bitstream defining a presentation, the presentation comprising an omnidirectional visual media content; and
indicate in the bitstream a definition for an external media, based on content creator control of externally sourced overlay rendering, to be overlaid on the presentation comprising the omnidirectional visual media content during rendering, where the external media is external to the bitstream defining the presentation;
wherein the definition comprises at least an overlay placement information for the external media on the presentation comprising the omnidirectional visual media content.

* * * * *